(12) United States Patent
Woo et al.

(10) Patent No.: US 11,830,978 B2
(45) Date of Patent: Nov. 28, 2023

(54) ADDITIVE, ELECTROLYTE FOR LITHIUM SECONDARY BATTERY AND LITHIUM SECONDARY BATTERY INCLUDING THE SAME

(71) Applicant: SAMSUNG SDI CO., LTD., Yongin-si (KR)

(72) Inventors: Myungheui Woo, Yongin-si (KR); Pavel Shatunov, Yongin-si (KR); Olga Tsay, Yongin-si (KR); Younghye Kang, Yongin-si (KR); Aeran Kim, Yongin-si (KR); Hyejin Park, Yongin-si (KR); Jeongmin Shin, Yongin-si (KR); Duckjae You, Yongin-si (KR); Taejin Lee, Yongin-si (KR); Harim Lee, Yongin-si (KR); Jinhyeok Lim, Yongin-si (KR); Wonseok Cho, Yongin-si (KR); Hyunbong Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 306 days.

(21) Appl. No.: 16/887,035

(22) Filed: May 29, 2020

(65) Prior Publication Data
US 2020/0381781 A1 Dec. 3, 2020

(30) Foreign Application Priority Data
May 31, 2019 (KR) .................. 10-2019-0064727

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/366* (2013.01); *H01M 4/386* (2013.01);
(Continued)

(58) Field of Classification Search
CPC ......... H01M 10/0567; H01M 10/0525; H01M 10/0569; H01M 2300/0028; H01M 2300/0037; H01M 4/525
See application file for complete search history.

(56) References Cited

U.S. PATENT DOCUMENTS

| | | | |
|---|---|---|---|
| 2011/0008680 A1* | 1/2011 | Muldoon | .......... H01M 10/0569 429/339 |
| 2013/0337317 A1 | 12/2013 | Shima et al. | |
| 2017/0110715 A1* | 4/2017 | Kajimoto | .............. H01M 4/505 |

FOREIGN PATENT DOCUMENTS

| | | |
|---|---|---|
| JP | 2004-259697 A | 9/2004 |
| JP | 2010-090068 A | 4/2010 |

(Continued)

*Primary Examiner* — Eugenia Wang
(74) *Attorney, Agent, or Firm* — Lee IP Law, P.C.

(57) ABSTRACT

An electrolyte additive for a lithium secondary battery, an electrolyte, and a lithium secondary battery, the additive including a compound represented by Formula 1 below:

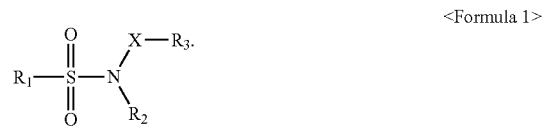

<Formula 1>

12 Claims, 6 Drawing Sheets

(51) Int. Cl.
    *H01M 10/0569*     (2010.01)
    *H01M 4/38*     (2006.01)
    *H01M 4/36*     (2006.01)
    *H01M 4/583*     (2010.01)
    *H01M 4/525*     (2010.01)
    *H01M 4/505*     (2010.01)

(52) U.S. Cl.
    CPC ........... *H01M 4/505* (2013.01); *H01M 4/525* (2013.01); *H01M 4/583* (2013.01); *H01M 10/0525* (2013.01); *H01M 10/0569* (2013.01); *H01M 2300/0028* (2013.01); *H01M 2300/0037* (2013.01); *H01M 2300/0045* (2013.01)

(56) References Cited

FOREIGN PATENT DOCUMENTS

| | | |
|---|---|---|
| JP | 2012-190791 A | 10/2012 |
| JP | 2014-186957 A | 10/2014 |
| JP | 2015-088492 A | 5/2015 |
| KR | 10-2018-0031585 A | 3/2018 |
| KR | 10-2018-0056395 A | 5/2018 |

* cited by examiner

ADDITIVE, ELECTROLYTE FOR LITHIUM SECONDARY BATTERY AND LITHIUM SECONDARY BATTERY INCLUDING THE SAME

CROSS-REFERENCE TO RELATED APPLICATION

Korean Patent Application No. 10-2019-0064727, filed on May 31, 2019, in the Korean Intellectual Property Office, and entitled: "Additive, Electrolyte for Lithium Secondary Battery and Lithium Secondary Battery Including the Same," is incorporated by reference herein in its entirety.

BACKGROUND

1. Field

Embodiments relate to an additive, an electrolyte for lithium secondary batteries, and a lithium secondary battery including the same.

2. Description of Related Art

Lithium secondary batteries are used as power sources for driving portable electronic appliances such as video cameras, mobile phones, and notebook computers. Rechargeable lithium secondary batteries have three times higher energy density per unit weight than lead batteries, nickel-cadmium batteries, nickel metal hydride batteries, and nickel-zinc batteries, and may be charged at high speed.

Since lithium secondary batteries are operated at a high driving voltage, aqueous electrolytes having high reactivity with lithium may not be used. An organic electrolyte may be used as the electrolyte for lithium secondary batteries. The organic electrolyte may be prepared by dissolving a lithium salt in an organic solvent. The organic solvent may be stable at a high voltage, and may have high ionic conductivity, a high dielectric constant, and low viscosity.

SUMMARY

The embodiments may be realized by providing an electrolyte additive for a lithium secondary battery, the additive comprising a compound represented by Formula 1 below:

<Formula 1> wherein, in Formula 1, X is O or S, $R_1$ to $R_3$ are each independently a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, or a substituted or unsubstituted vinyl group, and a substituent of the substituted $C_1$-$C_{30}$ alkyl group, the substituted $C_2$-$C_{30}$ alkenyl group, the substituted $C_2$-$C_{30}$ alkynyl group or the substituted vinyl group is a $C_1$-$C_{10}$ alkyl group, a $C_2$-$C_{10}$ alkenyl group, a $C_2$-$C_{20}$ alkynyl group, a $C_1$-$C_{10}$ alkoxy group, a halogen, a cyano group, a hydroxy group, or a nitro group.

X may be O.

In Formula 1, $R_1$ to $R_3$ may be each independently an unsubstituted $C_1$-$C_{30}$ alkyl group or a $C_1$-$C_{30}$ alkyl group substituted with a methyl group, an ethyl group, a propyl group, a butyl group, —F, —Cl, —Br, —I, a cyano group, a hydroxy group, or a nitro group.

In Formula 1, $R_1$ to $R_3$ may be each independently an unsubstituted $C_1$-$C_{30}$ alkyl group.

The compound represented by Formula 1 may be Compound 1 below:

<Compound 1>

The embodiments may be realized by providing an electrolyte for a lithium secondary battery, the electrolyte including a lithium salt; a non-aqueous organic solvent; and the additive according to an embodiment.

The additive may be included in the electrolyte in an amount of about 0.1 wt % to about 10 wt %, based on a total weight of the electrolyte.

The additive may be included in the electrolyte in an amount of about 0.1 wt % to about 5 wt %, based on a total weight of the electrolyte.

The lithium salt may include at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, in which $2 \le x \le 20$ and $2 \le y \le 20$, LiCl, LiI, lithium bis(oxalato) borate, or $LiPO_2F_2$.

The non-aqueous organic solvent may include at least one of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, or tetrahydrofuran.

The non-aqueous organic solvent may include a mixed solvent of about 50 vol % to about 95 vol % of a chain carbonate and about 5 vol % to about 50 vol % of a cyclic carbonate.

The embodiments may be realized by providing a lithium secondary battery including a cathode; an anode; and the electrolyte according to an embodiment.

The cathode may include a cathode active material having a layered structure.

The cathode active material may be represented by Formula 2:

<Formula 2> wherein, in Formula 2, M may be at least one of Co, Mn, Al, Cu, Fe, Mg, Cr, Zn, B, or Ga, and $0.9 \le s \le 1.2$ and $0 < t \le 0.99$ are satisfied.

The cathode active material may be represented by Formula 3 or Formula 4:

<Formula 3>

<Formula 4> wherein, in Formulae 3 and 4, $0.9 \le s' \le 1.2$, $0.1 < t' \le 0.98$, $0 < u' \le 0.5$, and $0 < 1-t'-u' \le 0.5$ are satisfied.

The anode may include an anode active material, the anode active material including at least one of a lithium metal, a metal alloyable with lithium, a transition metal oxide, a non-transition metal oxide, or a carbon material.

The anode active material may include at least one of a silicon compound, a carbon compound, a composite of the silicon compound and the carbon compound, or a silicon oxide ($SiO_a$, $0<a<2$).

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, an additive of an electrolyte for lithium secondary batteries, an organic electrolyte including the additive, and a lithium secondary battery employing the electrolyte according to embodiments will be described in more detail.

As used herein, "a" and "b" in "$C_a$-$C_b$" refer to the number of carbon atoms in a specific functional group. That is, the functional group may include "a" to "b" carbon atoms. Therefore, for example, the term "$C_1$-$C_4$ alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

Certain radical nomenclature may include mono-radicals or di-radicals depending on the context. For example, when one substituent requires two connection points in the remaining molecule, it is to be understood that the substituent is a di-radical. For example, a substituent recognized as an alkyl group requiring two connecting points includes a di-radical such as —$CH_2$—, —$CH_2CH_2$—, or —$CH_2CH(CH_3)CH_2$—. Another radical nomenclature clearly indicates that the radical is a di-radical such as "alkylene" or "alkenylene".

As used herein, the term "alkyl group" refers to a branched or unbranched aliphatic hydrocarbon group. In an embodiment, an alkyl group may be substituted or unsubstituted. Examples of the alkyl group may include, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group. In another embodiment, each of these alkyl groups may be selectively substituted. In another embodiment, the alkyl group may include 1 to 6 carbon atoms. Examples of the alkyl group having 1 to 6 carbon atoms may include, a methyl group, an ethyl group, a propyl group, an iso-propyl group, a butyl group, an iso-butyl group, a sec-butyl group, a pentyl group, a 3-pentyl group, and a hexyl group.

As used herein, the term "alkenyl group" is a hydrocarbon group having 2 to 20 carbon atoms including at least one carbon-carbon double bond, and examples thereof include, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. In another embodiment, an alkenyl group may be substituted or unsubstituted. In another embodiment, the number of carbon atoms in the alkenyl group may be 30. As used herein, the term "vinyl group" refers to an ethenyl group having structure represented by "$CH_2$=$CH$—*" (here, * is a bonding site with a neighboring atom).

As used herein, the term "alkynyl group" is a hydrocarbon group having 2 to 20 carbon atoms including at least one carbon-carbon triple bond, and examples thereof include, an ethynyl group, a 1-propynyl group, a 2-propynyl group, a 1-butynyl group, and a 2-butynyl group. In another embodiment, the alkynyl group may be substituted or unsubstituted. In another embodiment, the number of carbon atoms in the alkynyl group may be 2 to 30.

As used herein, a substituent may be derived from an unsubstituted parent group. Here, at least one hydrogen atom may be substituted with another atom or a functional group.

Unless otherwise expressed, when a function group is considered "substituted", it means that the functional group is substituted with at least one substituent selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group. When it is described that one functional group is "selectively substituted", the functional group may be substituted with the aforementioned substituent.

An additive of an electrolyte for a lithium secondary battery according to an embodiment may include, e.g., a compound represented by Formula 1 below.

<Formula 1>

In Formula 1, X may be, e.g., O or S.

$R_1$ to $R_3$ may each independently be or include, e.g., a substituted or unsubstituted $C_1$-$C_{30}$ alkyl group, a substituted or unsubstituted $C_2$-$C_{30}$ alkenyl group (e.g., a substituted or unsubstituted vinyl group), or a substituted or unsubstituted $C_2$-$C_{30}$ alkynyl group.

In an implementation, a substituent of the substituted $C_1$-$C_{30}$ alkyl group, the substituted $C_2$-$C_{30}$ alkenyl group, the substituted $C_2$-$C_{30}$ alkynyl group, or the substituted vinyl group may be, e.g., a $C_1$-$C_{10}$ alkyl group, a $C_2$-$C_{10}$ alkenyl group, a $C_2$-$C_{20}$ alkynyl group, a $C_1$-$C_{10}$ alkoxy group, a halogen, a cyano group, a hydroxy group, or a nitro group.

When the additive including the compound of Formula 1 is added to an electrolyte for a lithium secondary battery, the lifetime characteristics and high-temperature stability of the lithium secondary battery may be improved.

In an implementation, in Formula 1, X may be O.

In an implementation, in Formula 1, $R_1$ to $R_3$ may each independently be, e.g., an unsubstituted $C_1$-$C_{30}$ alkyl group, or a $C_1$-$C_{30}$ alkyl group substituted with a methyl group, an ethyl group, a propyl group, a butyl group, —F, —Cl, —Br, —I, a cyano group, a hydroxy group, or a nitro group.

In an implementation, in Formula 1, $R_1$ to $R_3$ may each independently be, e.g., an unsubstituted $C_1$-$C_{30}$ alkyl group.

In an implementation, the compound of Formula 1 may be, e.g., Compound 1 below.

<Compound 1>

Without being bound by theory, the compound may be added to an electrolyte to help improve the performance of a lithium secondary battery, and will be described in more detail below.

The compound represented by Formula 1 above may include a sulfone group (—$SO_2R$) and an alkoxyamide group having excellent electrical and chemical reactivity at the end thereof, and the decomposition of an organic solvent such as ethylene carbonate (EC) may be suppressed to help reduce the generation of gas, and thus a resistance increase rate may be lowered.

$LiPF_6$ may be used as the lithium salt included in an electrolyte. $LiPF_6$ may have insufficient thermal stability and may be easily hydrolyzed even by water. When the additive including the compound represented by Formula 1 is added to an electrolyte, $PF_5^-$ ions generated by the decomposition of water ($H_2O$) molecules and $LiPF_6$ may be captured by a sulfone group (—$SO_2R$), which is a functional group of Formula 1, and an alkoxyamide group, thereby suppressing the hydrolysis reaction of $LiPF_6$ by moisture. As a result, the generation of gas in the lithium secondary battery may be suppressed to help improve cycle lifetime characteristics. Further, the swelling phenomenon of a battery may be prevented or reduced due to the suppression or reduction of gas generation.

In addition, the sulfone group (—$SO_2R$) located at the end of Formula 1 may form a stable thin film on the surface of a metal substrate through a complexing reaction with metal ions, e.g., copper ions ($Cu'$) eluted from the metal substrate. Due to the formation of such a thin film, the additional elution of metal from the metal substrate may be suppressed, and the overdischarging of a battery during the storage of the battery may be suppressed to help improve battery characteristics.

During the initial charging of the lithium secondary battery, the decomposition reaction of an electrolyte may occur on the surface of an anode. The reason for this may be that the reduction potential of the electrolyte may be relatively higher than that of lithium. The decomposition reaction of an electrolyte may form a solid electrolyte interphase (SEI) on the surface of an electrode to help suppress the movement of electrons required for a reaction between an anode and an electrolyte, thereby preventing the additional decomposition of the electrolyte. Thus, the performance of a battery may depend on the characteristics of a film formed on the surface of an anode. Considering this, more rigid SEI layer may be formed and may have excellent electrical characteristics through the introduction of an electrolyte additive that is decomposed before the electrolyte during a charging reaction.

The additive for an electrolyte of a lithium secondary battery, represented by Formula 1, according to an embodiment may include a sulfone group (—$SO_2R$) having excellent electrochemical reactivity at one end thereof, and the additive may be decomposed before the electrolyte during a charging reaction, thereby forming an SEI film that is rigid and having excellent electrical characteristics on the surface of an anode.

In an implementation, the additive for an electrolyte of a lithium secondary battery, represented by Formula 1, according to an embodiment may include an alkoxyamide group at the other end thereof, and an SEI film having high alkoxyamide group concentration may be formed, thereby forming a chemically stable film having high polarity. In an implementation, the resistance at the interface between an electrolyte and an anode may be lowered to help improve the conductivity of lithium ions, and there is an effect of increasing a low-temperature discharge voltage.

In an implementation, the sulfone group (—$SO_2R$) may have excellent electrochemical reactivity, a transition metal oxide and a donor-acceptor bond, exposed to the surface of a cathode active material, may be formed, and a protective layer may be formed in the form of a composite.

An electrolyte for a lithium secondary battery according to an embodiment may include, e.g., a lithium salt; a non-aqueous organic solvent; and the additive.

In an implementation, the additive may be included in the electrolyte in an amount of about 0.1 wt % to about 10 wt %, based on the total weight of the electrolyte. In an implementation content thereof may be appropriately selected within a range that does not deteriorate the characteristics of a battery. In an implementation, the additive may be included in the electrolyte in an amount of about 0.1 wt % to about 5 wt %, based on the total weight of the electrolyte.

Maintaining the amount of the additive is at about 10 wt % or less, based on the total weight of the electrolyte, may help ensure that battery life does not deteriorate.

In an implementation, the lithium salt may include, e.g., at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($2 \le x \le 20$, $2 \le y \le 20$), LiCl, LiI, lithium bis(oxalate) borate (LiBOB), or $LiPO_2F_2$. In an implementation, the lithium salt may include another suitable lithium salt.

In an implementation, the concentration of the lithium salt in the electrolyte may be, e.g., about 0.01 M to about 2.0 M. An appropriate concentration may be used as needed. Within the above concentration range, further improved battery characteristics may be obtained.

In an implementation, the non-aqueous organic solvent may include, e.g., at least one of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, or tetrahydrofuranm. In an implementation, another suitable organic solvent may be used.

In an implementation, the non-aqueous organic solvent may include, e.g., a mixed solvent of about 50 vol % to about 95 vol % of a chain carbonate and about 5 vol % to about 50 vol % of a cyclic carbonate.

The electrolyte may be in a liquid or gel state. The electrolyte may be prepared by adding the lithium salt and the additive to the organic solvent.

A lithium secondary battery according to another embodiment may include, e.g., a cathode; an anode; and the electrolyte. In an implementation, the lithium battery may include a lithium secondary battery such as a lithium ion battery, a lithium ion polymer battery, and a lithium sulfur battery, as well as a lithium primary battery.

In an implementation, the operating voltage of the lithium secondary battery may be about 4.2 V or more, e.g., about 4.3 V or more, for example, about 4.45 V or more.

In an implementation, the lithium secondary battery may be manufactured by the following method.

First, a cathode may be prepared.

In an implementation, a cathode active material composition in which a cathode active material, a conductive material, a binder, and a solvent are mixed may be prepared. A cathode plate may be prepared by coating a cathode current collector with the cathode active material composition. In an implementation, the cathode plate may be prepared by casting the cathode active material composition onto a separate support, separating a film from the support and then laminating the separated film on a metal current collector.

The cathode active material, which is a lithium-containing metal oxide, may include a suitable active material. As the lithium-containing metal oxide, e.g., two or more kinds of composite oxides of lithium and a metal selected from cobalt, manganese, nickel, and combinations thereof may be used. In an implementation, as lithium-containing metal oxide, a compound represented by any one of Formulae of $Li_aA_{1-b}B^1_bD^1_2$ (where, $0.90 \le a \le 1.8$ and $0 \le b \le 0.5$ are satisfied); $Li_aE_{1-b}B^1_bO_{2-c}D^1_c$ (where, $0.90 \le a \le 1.8$, $0 \le b \le 0.5$, and $0 \le c \le 0.05$ are satisfied); $LiE_{2-b}B^1_bO_{4-c}D^1_c$ (where, $0 \le b \le 0.5$ and $0 \le c \le 0.05$ are satisfied); $Li_aNi_{1-b-c}Co_bB^1_cD^1_\alpha$ (where, $0.90 \le a \le 1.8$, $0 \le b \le 0.5$, $0 \le c \le 0.05$, and $0 < \alpha \le 2$ are satisfied); $Li_aNi_{1-b-c}Co_bB^1_cO_{2-\alpha}F^1_\alpha$ (where, $0.90 \le a \le 1.8$, $0 \le b \le 0.5$, $0 \le c \le 0.05$, and $0 < \alpha < 2$ are satisfied); $Li_aNi_{1-b-c}Co_bB^1_cO_{2-\alpha}F^1_2$ (where, $0.90 \le a \le 1.8$, $0 \le b \le 0.5$, $0 \le c \le 0.05$, and $0 < \alpha < 2$ are satisfied); $Li_aNi_{1-b-c}Mn_bB^1_cD^1_\alpha$ (where, $0.90 \le a \le 1.8$, $0 \le b \le 0.5$, $0 \le c \le 0.05$, and $0 < \alpha \le 2$ are satisfied); $Li_aNi_{1-b-c}Mn_bB^1_cO_{2-\alpha}F^1_\alpha$ (where, $0.90 \le a \le 1.8$, $0 \le b \le 0.5$, $0 \le c \le 0.05$, and $0 < \alpha < 2$ are satisfied); $Li_aNi_{1-b-c}Mn_bB^1_cO_{2-\alpha}F^1_2$ (where, $0.90 \le a \le 1.8$, $0 \le b \le 0.5$, $0 \le c \le 0.05$, and $0 < \alpha < 2$ are satisfied); $Li_aNi_bE_cG_dO_2$ (where, $0.90 \le a \le 1.8$, $0 \le b \le 0.9$, $0 \le c \le 0.5$, and $0.001 \le d \le 0.1$ are satisfied); $Li_aNi_bCo_cMn_dG_eO_2$ (where, $0.90 \le a \le 1.8$, $0 \le b \le 0.9$, $0 \le c \le 0.5$, $0 \le d \le 0.5$, and $0.001 \le e \le 0.1$ are satisfied); $Li_aNiG_bO_2$ (where, $0.90 \le a \le 1.8$ and $0.001 \le b \le 0.1$ are satisfied); $Li_aCoG_bO_2$ (where, $0.90 \le a \le 1.8$ and $0.001 \le b \le 0.1$ are satisfied); $Li_aMnG_bO_2$ (where, $0.90 \le a \le 1.8$ and $0.001 \le b \le 0.1$ are satisfied); $Li_aMn_2G_bO_4$ (where, $0.90 \le a \le 1.8$ and $0.001 \le b \le 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$ may be used.

In the formulae above, A may be, e.g., Ni, Co, Mn, or a combination thereof; $B^1$ may be, e.g., Al, Ni, Co, Mn, Cr, Fe, Mg, Sr, V, a rare earth element, or a combination thereof; $D^1$ may be, e.g., O, F, S, P, or a combination thereof; E is Co, Mn, or a combination thereof; $F^1$ may be, e.g., F, S, P, or a combination thereof; G may be, e.g., Al, Cr, Mn, Fe, Mg, La, Ce, Sr, V, or a combination thereof; Q may be, e.g., Ti, Mo, Mn, or a combination thereof; $I^1$ may be, e.g., Cr, V, Fe, Sc, Y, or a combination thereof; and J may be, e.g., V, Cr, Mn, Co, Ni, Cu, or a combination thereof.

In an implementation, the lithium-containing metal oxide may be $LiCoO_2$, $LiMn_gO_{2g}$ (g=1 or 2), $LiNi_{1-g}Mn_gO_{2g}$ (0<g<1), $LiNi_{1-g-k}Co_gMn_kO_2$ ($0 \le g \le 0.5$, $0 \le k \le 0.5$), or $LiFePO_4$.

In an implementation, the cathode may include a cathode active material having a layered structure.

In an implementation, the cathode active material may be represented by Formula 2 below.

<Formula 2>

In Formula 2,

M may be, e.g., at least one of Co, Mn, Al, Cu, Fe, Mg, Cr, Zn, B, and Ga, and $0.9 \le s \le 1.2$ and $0 \le t \le 0.99$ may be satisfied.

In an implementation, the cathode active material may be, e.g., represented by Formula 3 or Formula 4.

<Formula 3>

<Formula 4>

In Formulae 3 and 4, $0.9 \le s' \le 1.2$, $0.1 < t' \le 0.98$, $0 < u' \le 0.5$, and $0 < 1-t'-u' \le 0.5$ may be satisfied.

In an implementation, the cathode active material may be, e.g., at least one of $LiNi_{1/3}Co_{1/3}Mn_{1/3}O_2$, $LiNi_{1/3}Co_{1/3}Al_{1/3}O_2$, $LiNi_{0.6}Co_{0.2}Mn_{0.2}O_2$, $LiNi_{0.6}Co_{0.2}Al_{0.2}O_2$, $LiNi_{0.8}Co_{0.1}Mn_{0.1}O_2$, or $LiNi_{0.8}Co_{0.1}Al_{0.1}O_2$.

In an implementation, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, a suitable coating method may be used as long as this compound may be coated with such elements by a method that does not adversely affect the physical properties of the cathode active material (e.g., spray coating, dipping or the like).

In an implementation, the conductive material may include, e.g., carbon black or graphite particles, or another suitable conductive material.

In an implementation, the binder may include, e.g., a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. or another suitable binder.

In an implementation the solvent may include, e.g., N-methylpyrrolidone, acetone, water, or the like, or another suitable solvent.

The content of the cathode active material, the content of the conductive material, the content of the binder, and the content of the solvent may be suitable levels for the lithium secondary battery. In an implementation, at least one of the conductive material, the binder, and the solvent may be omitted depending on the use and configuration of the lithium secondary battery.

Next, an anode may be prepared.

In an implementation, an anode active material composition in which an anode active material, a conductive material, a binder, and a solvent are mixed may be prepared. An anode plate may be prepared by directly coating an anode current collector with the anode active material composition and drying the anode active material composition. In an implementation, the anode plate may be prepared by casting the anode active material composition onto a separate support, separating a film from the support and then laminating the separated film on a metal current collector.

In an implementation, a suitable anode active material may be used. In an implementation, the anode active material may include, e.g., a lithium metal, a metal alloyable with lithium, a transition metal oxide, a non-transition metal oxide, or a carbon material.

In an implementation, the anode active material may include, e.g., a silicon compound, a carbon compound, or a composite of the silicon compound and the carbon compound. The silicon compound may be, e.g., silicon particles, silicon alloy particles, or the like. In an implementation, the silicon compound may be, e.g., a silicon oxide ($SiO_a$, $0<a<2$).

The size of the silicon compound is less than 200 nm, e.g., about 10 nm to about 150 nm. The term "size" may refer to an average particle diameter when the silicon compound is spherical, and may refer to a long axis length when the silicon particle is non-spherical.

When the size of the silicon compound is within the above range, life characteristics may be excellent. Thus, when the electrolyte according to an embodiment is used, the lifetime of the lithium secondary battery is further improved.

The carbon material may include, e.g., crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The composite of the silicon compound and the carbon compound may be a composite having a structure in which silicon nanoparticles are arranged on the carbon compound, a composite having a structure in which silicon nanoparticles are arranged on the surface of the carbon compound and inside the carbon compound, or a composite having a structure in which silicon nanoparticles are coated with the carbon compound and are included in the carbon compound. In the composite of the silicon compound and the carbon compound, the carbon compound may be graphite, graphene, graphene oxide, or a combination thereof.

The composite of the silicon compound and the carbon compound may be an active material obtained by dispersing silicon nanoparticles having an average particle diameter of about 200 nm or less on the carbon compound particles and carbon-coating the dispersed silicon nanoparticles, or an active material in which silicon (Si) particles exist on graphite and in graphite. The average particle diameter of secondary particles of the composite of the silicon compound and the carbon compound may be about 5 μm to about 20 μm. The average particle diameter of the silicon nanoparticles may be about 5 nm or more, e.g., about 10 nm or more, about 20 nm or more, about 50 nm or more, or about 70 nm or more. The average particle diameter of the silicon nanoparticles may be, e.g., about 200 nm or less, about 150 nm or less, about 100 nm or less, about 50 nm or less, about 20 nm or less, or about 10 nm or less. In an implementation, the average particle diameter of silicon nanoparticles may be about 100 nm to about 150 nm.

The average particle diameter of secondary particles of the composite of the silicon compound and the carbon compound may be about 5 μm to about 18 μm, e.g., about 7 μm to about 15 μm or about 10 μm to about 13 μm.

Other examples of the composite of the silicon compound and the carbon compound may include e.g., a porous silicon composite cluster structure and a porous silicon composite cluster structure. Korea Patent Publication 10-2018-0031585 and Korea Patent Publication 10-2018-0056395 are incorporated herein by reference.

The composite of the silicon compound and the carbon compound according to an embodiment may be a porous silicon composite cluster that contains a porous core including a porous silicon composite secondary particle and a shell including a second graphene disposed on the core. The porous silicon composite secondary particle may include an aggregate of two or more silicon composite primary particles. The silicon composite primary particle may be a porous silicon composite cluster including silicon, a silicon oxide ($SiO_a$)($0<a<2$) on the silicon, and first graphene on the silicon oxide. The composite of the silicon compound and the carbon compound according to another embodiment may include: a porous silicon composite cluster including a porous silicon composite secondary particle and a second carbon flake on at least one surface of the porous silicon composite secondary particle; and a carbon coating film including amorphous carbon and disposed on the porous silicon composite cluster. The porous silicon composite secondary particle may include an aggregate of two or more silicon composite primary particles. The silicon composite primary particle may include silicon, a silicon oxide ($SiO_a$) ($0<a<2$) on at least one surface of the silicon, and first carbon flake on at least one surface of the silicon oxide. The silicon oxide may be a porous silicon composite cluster structure existing in the form of a film, matrix, or a combination thereof.

Each of the first carbon flake and the second carbon flake may exist in the form of a film, particle, matrix, or a combination thereof. Each of the first carbon flake and the second carbon flake may be graphene, graphite, carbon fiber, graphene oxide, or the like.

The above-described composite of the silicon compound and the carbon compound may be implemented in the following form.

In an implementation, the composite of the silicon compound and the carbon compound may be implemented in the form of an active material obtained by dispersing silicon (Si) particles having an average particle diameter of about 50 nm to about 150 nm on a graphite particle and coating the graphite particle with a carbon-based material.

In an implementation, the composite of the silicon compound and the carbon compound may be implemented by forming a plurality of primary particles, in which silicon (Si) particles having an average particle diameter of about 50 nm to about 150 nm are located on graphite, into a secondary particle, and may further be implemented by coating the secondary particle with a carbon-based material.

In an implementation, the composite of the silicon compound and the carbon compound may be implemented in the form of a composite of silicon (Si) particles and amorphous carbon without graphite.

The composite of the silicon compound and the carbon compound may include, e.g., a porous silicon composite cluster.

In an implementation, the metal alloyable with lithium may be Si, Sn, Al, Ge, Pb, Bi, Sb, a Si—Y' alloy (Y' is an alkaline metal, an alkaline earth metal, a group 13 element, a group 14 element, a transition metal, or a combination thereof, not Si), or a Sn—Y' alloy (Y' is an alkaline metal, an alkaline earth metal, a group 13 element, a group 14 element, a transition metal, or a combination thereof, not Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

In an implementation, the transition metal oxide may be lithium titanium oxide, vanadium oxide, lithium vanadium oxide, or the like.

In an implementation, the non-transition metal oxide may be $SnO_2$, $SiO_x$ (0<x<2), or the like.

The conductive material, binder, and solvent in the anode active material composition may be the same as those in the cathode active material composition.

The content of the anode active material, the content of the conductive material, the content of the binder, and the content of the solvent may be suitable levels for the lithium secondary battery. At least one of the conductive material, the binder, and the solvent may be omitted depending on the use and configuration of the lithium secondary battery.

Next, a separator to be inserted between the anode and the cathode may be prepared.

As the separator, a suitable separator for a lithium battery may be used. A separator having low resistance to the movement of ions in the electrolyte and superior in electrolyte wettability may be used. In an implementation, the separator may include, e.g., glass fiber, polyester, polyethylene, polypropylene, polytetrafluoroethylene (PTFE), or combinations thereof, and may be made in the form of nonwoven fabric or woven fabric. In an implementation, a windable separator including polyethylene, polypropylene, or the like may be used in a lithium ion battery, and a separator having good electrolyte impregnation ability may be used in a lithium ion polymer battery. For example, the separator may be produced by the following method.

A polymer resin, a filler, and a solvent may be mixed to prepare a separator composition. The separator composition is directly applied on an electrode and dried to form a separator. In an implementation, the separator composition is cast on a support and dried, a separation film is separated from the support, and then the separation film may be laminated on the electrode to form a separator.

The polymer resin used in the production of the separator may include a suitable material for a binder of an electrode plate. In an implementation, as the polymer resin, a vinylidene fluoride/hexafluoropropylene copolymer, polyvinylidene fluoride (PVDF), polyacrylonitrile, polymethyl methacrylate, or a mixture thereof may be used.

Next, the above-described electrolyte for a lithium secondary battery may be prepared.

Figure 1:
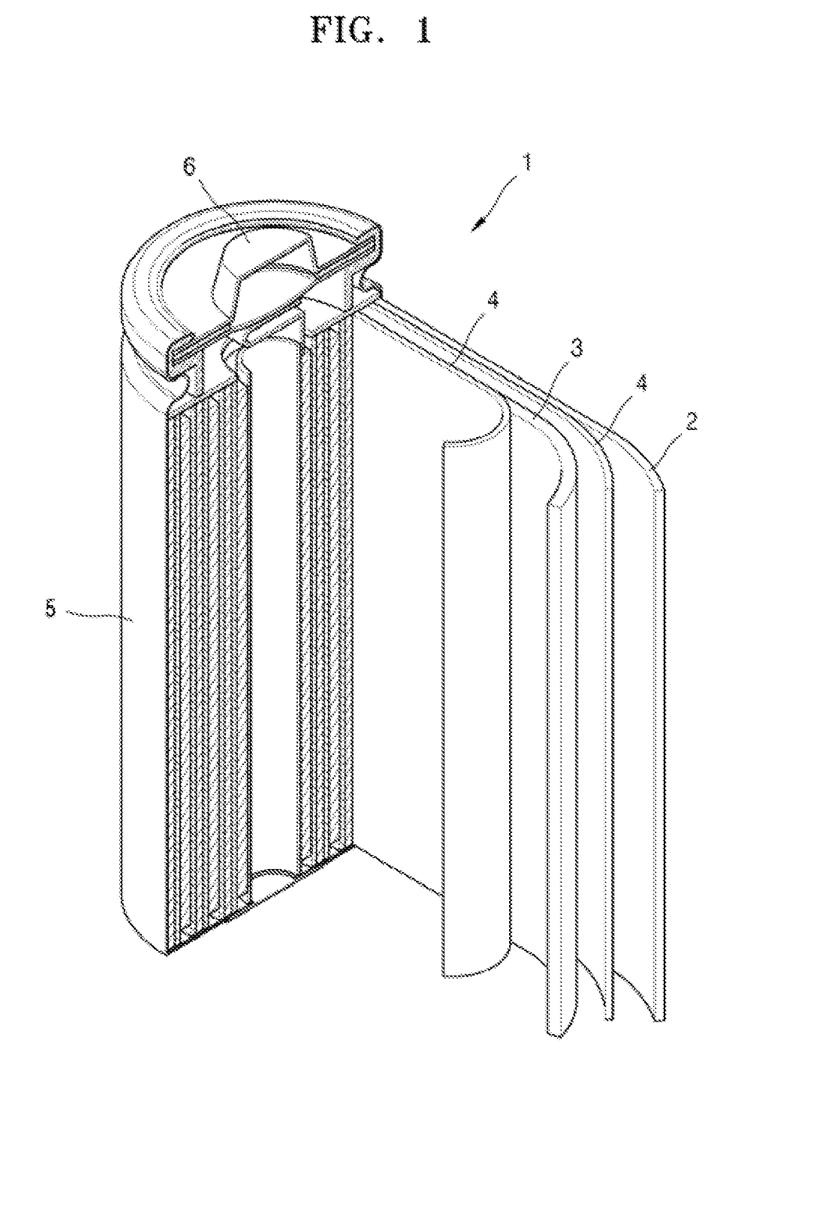
FIG. 1 is a schematic view of a lithium secondary battery according to an embodiment.

As shown in FIG. 1, the lithium secondary battery 1 includes a cathode 3, an anode 2, and a separator 4. The anode 2, the cathode 3, and the separator 4 may be wound (or folded) and accommodated in a battery case 5. Then, an electrolyte is injected into the battery case 5, and the battery case 5 is sealed with a cap assembly 6 to complete the manufacture of the lithium secondary battery 1. The battery case 5 may have, e.g., a cylindrical shape, a rectangular shape, or a thin film shape. In an implementation, the lithium secondary battery 1 may be a large-sized thin-film battery. The lithium secondary battery 1 may be a lithium ion battery.

The separator 4 may be located between the anode 2 and the cathode 3 to form a battery structure. The battery structure may be laminated as a bi-cell structure and then impregnated with an electrolyte, and the resulting product is accommodated in a pouch and sealed to complete a lithium ion polymer battery.

In an implementation, the plurality of battery structures are laminated to form a battery pack, and this battery pack may be used in all appliances requiring high capacity and high power. In an implementation, the battery pack may be used in notebooks, smart phones, electric vehicles, and the like.

In an implementation, the lithium secondary battery may be excellent in lifetime characteristics and high rate characteristics, and it may be used in electric vehicles (EV). In an implementation, the lithium secondary battery may be used in hybrid vehicles such as plug-in hybrid electric vehicles. In an implementation, the lithium secondary battery may be used in fields requiring a large amount of electric power storage. In an implementation, the lithium secondary battery may be used in electric bicycles, electric tools, and the like.

The following Examples and Comparative Examples are provided in order to highlight characteristics of one or more embodiments, but it will be understood that the Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Electrolyte)

Preparation Example 1

$LiPF_6$ was added to a mixed solvent (in which ethylene carbonate (EC) and dimethyl carbonate (DMC) were mixed at a volume ratio of 3:7) in an amount sufficient to prepare a 1 M solution to prepare a mixed solution.

1.0 wt % of Compound 1 below was added to the mixed solution to prepare an electrolyte for a lithium secondary battery.

<Compound 1>

Comparative Preparation Example 1

An electrolyte for a lithium secondary battery was prepared in the same manner as in Preparation Example 1, except that the Compound 1 was not added, and vinylene carbonate (VC) was added in an amount of 2.0 wt % based on the mixed solution.

Comparative Preparation Example 2

An electrolyte for a lithium secondary battery was prepared in the same manner as in Preparation Example 1, except that Compound A below, instead of the Compound 1 above, was added in an amount of 1.0 wt %, and vinylene carbonate (VC) was added in an amount of 2.0 wt % based on the mixed solution.

<Compound A>

(Manufacture of Lithium Secondary Battery)

EXAMPLE 1

87 wt % of graphite, 11 wt % of a composite of the silicon compound and the carbon compound, 1 wt % of a styrene-butadiene rubber (SBR) binder (ZEON), and 1.0 wt % of carboxymethyl cellulose binder (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

(Preparation of Cathode)

97 wt % of $LiNi_{0.8}Co_{0.1}Mn_{0.1}O_2$(NCM), 0.5 wt % of artificial graphite (SFG6, Timcal) powder, 0.8 wt % of carbon black (Ketjenblack, ECP), 0.2 wt % of modified acrylonitrile rubber (BM-720H, manufactured by Zeon Corporation), 1.2 wt % of polyvinylidene fluoride (PVDF, S6020, Solvay), and 0.3 wt % of polyvinylidene fluoride (PVDF, S5130, Solvay) were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured by using a polyethylene separator having a thickness of 14 μm and coated with ceramic on a side of anode and using the electrolyte prepared in Preparation Example 1.

Comparative Example 1

A lithium secondary battery was manufactured in the same manner as in Example 1, except that the electrolyte prepared in Comparative Preparation Example 1 was used instead of the electrolyte prepared in Preparation Example 1.

Comparative Example 2

A lithium secondary battery was manufactured in the same manner as in Example 1, except that the electrolyte prepared in Comparative Preparation Example 2 was used instead of the electrolyte prepared in Preparation Example 1.

Evaluation Example 1: Initial Resistance Test

Figure 2:
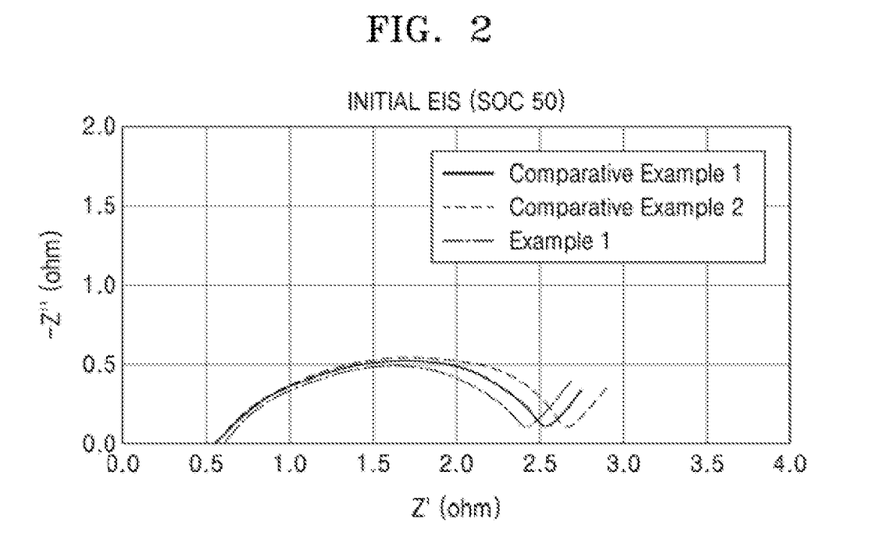
FIG. 2 is graph illustrating the initial EIS of the lithium secondary batteries of Example 1 and Comparative Examples 1 and 2 under the condition of SOC 50.
Figure 3:
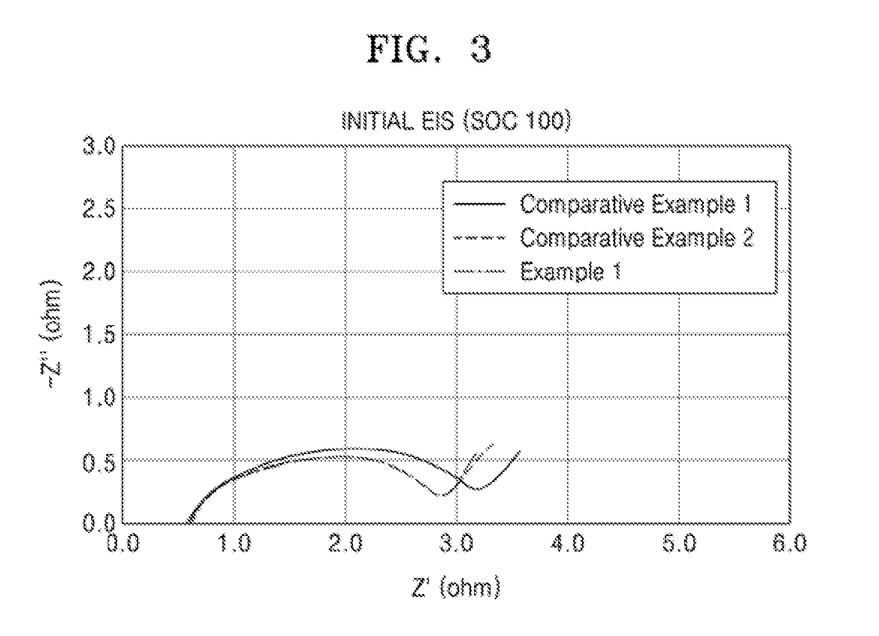
FIG. 3 is graph illustrating the initial EIS of the lithium secondary batteries of Example 1 and Comparative Examples 1 and 2 under the condition of SOC 100.

The electrochemical impedance spectroscopy (EIS) of the lithium secondary batteries of Example 1 and Comparative Examples 1 and 2 according to state of charge (SOC) was measured, the degree of resistance formed on the interface of an electrode was measured, and the results thereof are shown in FIGS. 2 and 3.

FIG. 2 is a graph showing the initial EIS under the condition of SOC 50, and

FIG. 3 is a graph showing the initial EIS under the condition of SOC 100.

Referring to FIGS. 2 and 3, it may be seen that the lithium secondary battery of Example 1 was improved in initial resistance as compared with the lithium secondary batteries of Comparative Examples 1 and 2.

Evaluation Example 2: High-Temperature Storage Characteristic Test

1) After the lithium secondary batteries of Example 1 and Comparative

Figure 4:
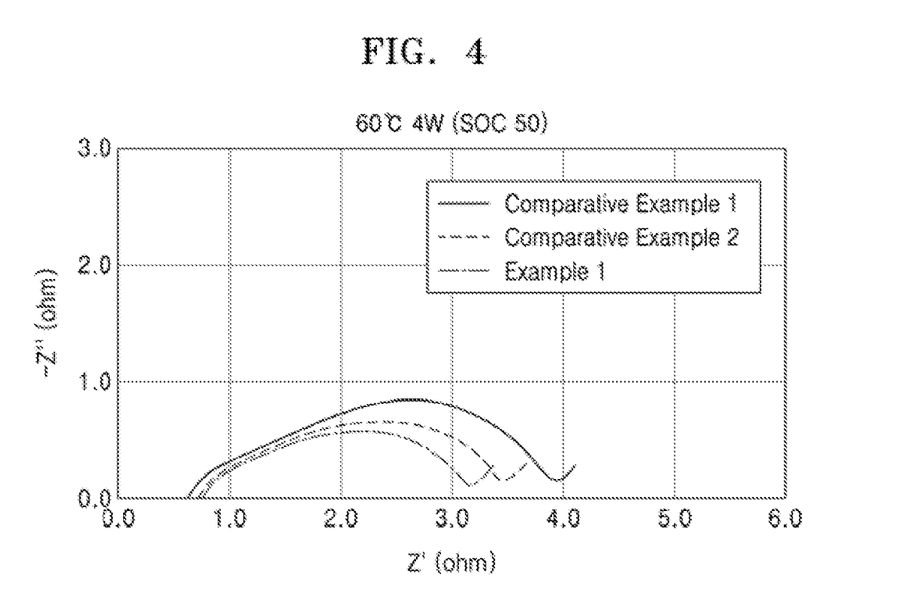
FIG. 4 is graph illustrating the EIS change of the lithium secondary batteries of Example 1 and Comparative Examples 1 and 2 after high-temperate storage under the condition of SOC 50.

Examples 1 and 2 were stored at 60° C. for four weeks, the EIS thereof according to SOC was measured, the degree of resistance formed on the interface of an electrode was measured, and the results thereof are shown in FIG. 4.

Referring to FIG. 4, it may be seen that, comparing the degree of resistance under the condition of SOC 50, resistance increase inhibition characteristics were improved during high-temperature storage.

Figure 5:
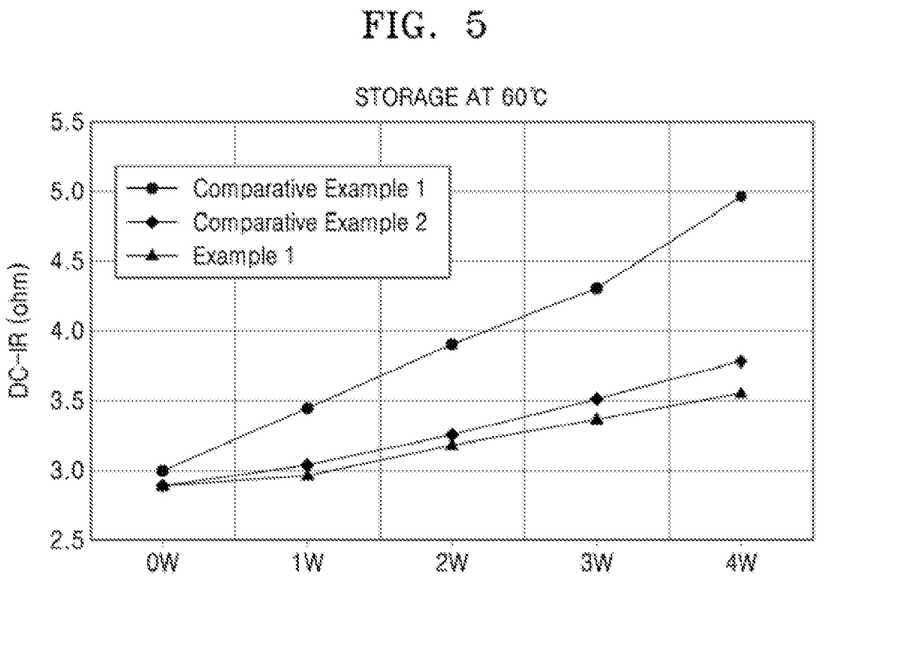
FIG. 5 is graph illustrating the resistance change of the lithium secondary batteries of Example 1 and Comparative Examples 1 and 2 after high-temperate storage.

2) The lithium secondary batteries of Example 1 and Comparative Examples 1 and 2 were stored at 60° C. for four weeks, the resistance increase rates of the lithium secondary batteries for four weeks were measured, and the results thereof are shown in FIG. 5.

In this case, the resistance value is a DC-IR value for 10 seconds obtained by discharging the lithium secondary battery at 1C rate for 10 seconds under the condition of SOC 50 and then dividing a voltage change by a current.

Referring to FIG. 5, it may be seen that the longer the storage time at high temperature, the better the resistance increase inhibition characteristics of the lithium secondary battery of Example 1 as compared with the lithium secondary batteries of Comparative Examples 1 and 2.

Evaluation Example 3: Cycle Characteristic Test

1) Each of the lithium secondary batteries of Example 1 and Comparative Examples 1 and 2 was charged with a constant current at a current of 0.2 C rate at 25° C. until a voltage reached 4.3 V, and was then cut-off at a current of 0.05 C rate while maintaining the voltage 4.3 V at a constant voltage mode. Subsequently, each of the lithium secondary batteries was charged with a constant current at a current of 0.2 C rate until the voltage reached 2.8 V during discharging. Thus, the charge-discharge capacity of each of the lithium secondary batteries was confirmed.

Subsequently, each of the lithium secondary batteries was charged with a constant current at a current of 1 C rate until a voltage reached 4.3 V, and was then cut-off at a current of 0.05 C rate while maintaining the voltage 4.3 V at a constant voltage mode. Subsequently, each of the lithium secondary batteries was charged with a constant current at a current of 1 C rate until a voltage reached 2.8 V (formation step, 1st cycle). This charge-discharge cycle was repeated up to 300 times. Further, rated capacity was measured for each 100 cycles.

A stop time of 10 minutes was set after one charge-discharge cycle in all the charge-discharge cycles.

Figure 6:
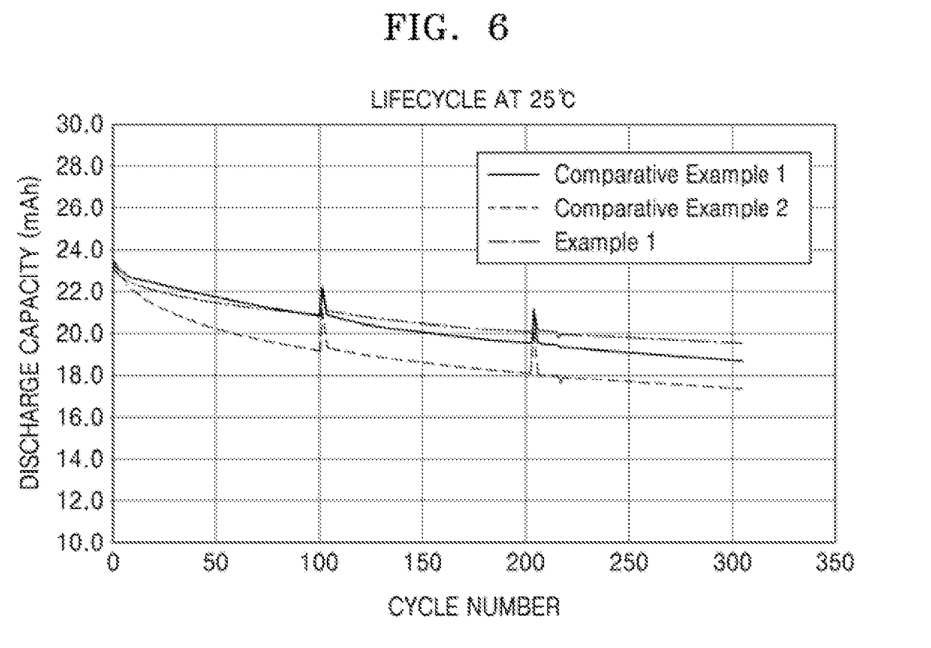
FIG. 6 is graph illustrating the lifetime characteristics of the lithium secondary batteries of Example 1 and Comparative Examples 1 and 2 at room temperature.

The results of the charge-discharge experiment are shown in FIG. 6.

Referring to FIG. 6, it may be seen that cycle characteristics of Example 1 were better than those of Comparative Examples 1 and 2.

2) in 1) above, EIS of each of the lithium secondary batteries of Example 1 and

Figure 7:
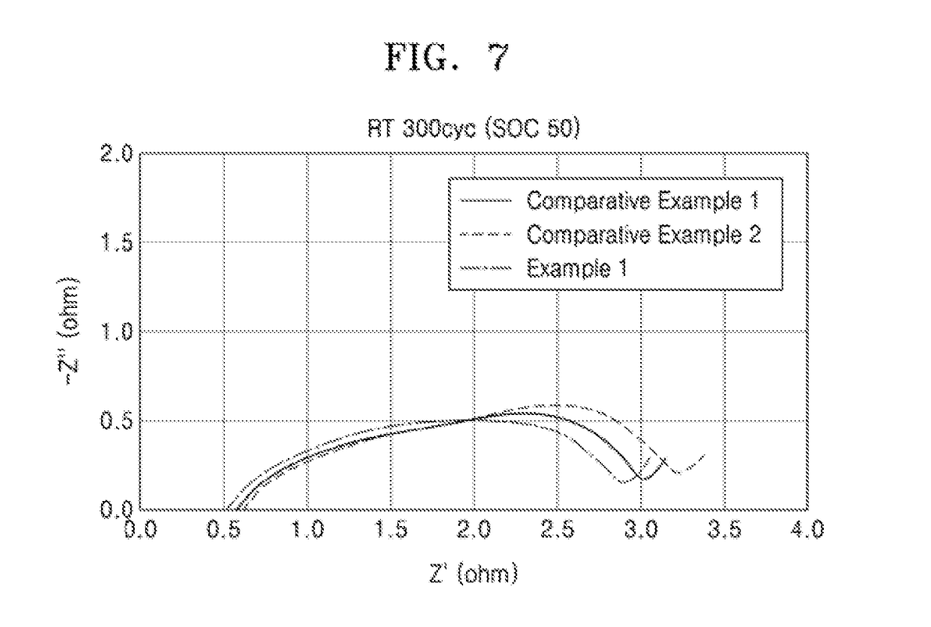
FIG. 7 is graph illustrating the resistance change of the lithium secondary batteries of Example 1 and Comparative Examples 1 and 2 according to cycle under the condition of SOC 50 at room temperature (RT)
Figure 8:
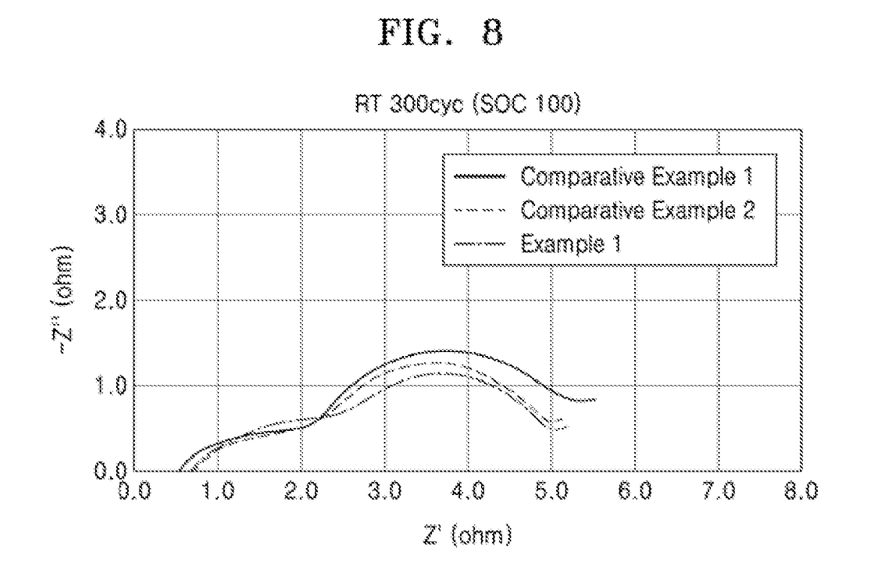
FIG. 8 is graph illustrating the resistance change of the lithium secondary batteries of Example 1 and Comparative Examples 1 and 2 according to cycle under the condition of SOC 100 at room temperature (RT)

Comparative Examples 1 and 2 after 300 cycles was measured according to SOC, and the results thereof were shown in FIGS. 7 and 8.

Referring to FIGS. 7 an 8, it may be seen that the lifetime and resistance characteristics of the lithium secondary battery of Example 1 after 300 cycles were improved as compared with those of the lithium secondary battery of Comparative Example 2 as well as Comparative Example 1.

Evaluation Example 4: High-Temperature (45° C.) Cycle Characteristic Test

1) Each of the lithium secondary batteries of Example 1 and Comparative Examples 1 and 2 was charged with a constant current at a current of 0.5 C rate at 25° C. until a voltage reached 4.3 V, and was then cut-off at a current of 0.05 C rate while maintaining the voltage 4.3 V at a constant voltage mode. Subsequently, each of the lithium secondary batteries was charged with a constant current at a current of 1 C rate until a voltage reached 2.8 V (formation step, 1st cycle). This charge-discharge cycle was repeated once more.

Subsequently, this charge-discharge cycle was repeated up to 200 times at 45° C. Further, rated capacity was measured for each 100 cycles.

A stop time of 10 minutes was set after one charge-discharge cycle in all the charge-discharge cycles.

Figure 9:
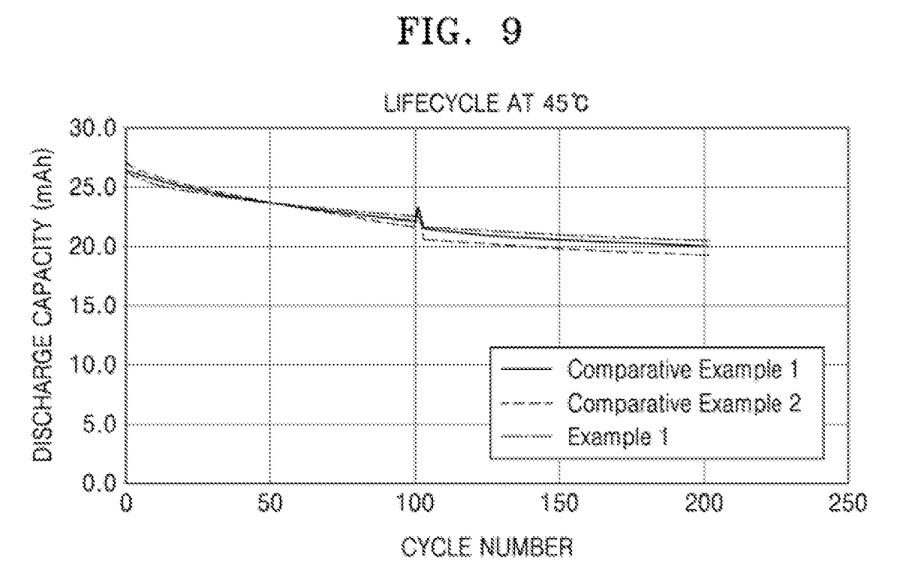
FIG. 9 is graph illustrating the lifetime characteristics of the lithium secondary batteries of Example 1 and Comparative Examples 1 and 2 at high temperature.

The results of the charge-discharge experiment are shown in FIG. 9.

Referring to FIG. 9, it may be seen that high-temperature cycle characteristics of Example 1 were better than those of Comparative Examples 1 and 2.

Figure 10:
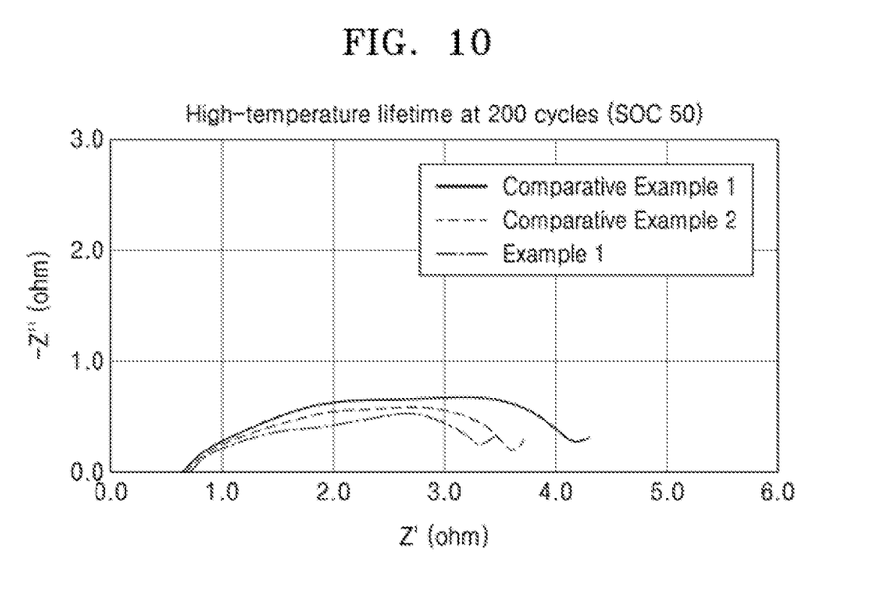
FIG. 10 is graph illustrating the resistance change of the lithium secondary batteries of Example 1 and Comparative Examples 1 and 2 according to cycle at high temperature under the condition of SOC 50.

2) in 1) above, EIS of each of the lithium secondary batteries of Example 1 and Comparative Examples 1 and 2 after 200 cycles was measured according to SOC, and the results thereof are shown in FIG. 10.

Referring to FIG. 10, it may be seen that the lifetime and resistance characteristics of the lithium secondary battery of Example 1 after 200 cycles were improved, as compared with those of the lithium secondary battery of Comparative Example 2 as well as Comparative Example 1.

By way of summation and review, when an organic electrolyte including a lithium salt is used as the electrolyte for lithium secondary batteries, the lifetime characteristics and high-temperature stability of a lithium secondary battery could be deteriorated by a side reaction between anode/cathode and an electrolyte.

An electrolyte for lithium secondary batteries according to an embodiment may be capable of providing a lithium secondary battery having improved lifetime characteristics and high-temperature stability.

According to one or more embodiment, when an electrolyte for a lithium secondary battery is the electrolyte including an additive including a sulfone compound having a structure described herein, lifetime characteristics and high-temperature characteristics of a lithium secondary battery may be improved.

One or more embodiments may provide an additive of an electrolyte for a lithium secondary battery.

One or more embodiments may provide an electrolyte for a lithium secondary battery, including the additive.

One or more embodiments may provide a lithium secondary battery including the electrolyte.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. An electrolyte for a lithium secondary battery, the electrolyte comprising:
a lithium salt;
a non-aqueous organic solvent; and
an additive,
wherein the additive includes a compound represented by Formula 1,

<Formula 1> wherein, in Formula 1,
X is S,
$R_1$ to $R_3$ are each independently a substituted or unsubstituted $C_1$-$C_{30}$ alkyl group, a substituted or unsubstituted $C_2$-$C_{30}$ alkenyl group, or a substituted or unsubstituted $C_2$-$C_{30}$ alkynyl group, and a substituent of the substituted $C_1$-$C_{30}$ alkyl group, the substituted $C_2$-$C_{30}$ alkenyl group, the substituted $C_2$-$C_{30}$ alkynyl group, or the substituted vinyl group is a $C_1$-$C_{10}$ alkyl group, a $C_2$-$C_{10}$ alkenyl group, a $C_2$-$C_{20}$ alkynyl group, a $C_1$-$C_{10}$ alkoxy group, a halogen, a cyano group, a hydroxy group, or a nitro group, and wherein the compound represented by Formula 1 is included in the electrolyte in an amount of about 0.1 wt % to about 5 wt %, based on a total weight of the electrolyte.

2. The electrolyte as claimed in claim 1, wherein, in Formula 1, $R_1$ to $R_3$ are each independently an unsubstituted $C_1$-$C_{30}$ alkyl group or a $C_1$-$C_{30}$ alkyl group substituted with a methyl group, an ethyl group, a propyl group, a butyl group, —F, —Cl, —Br, —I, a cyano group, a hydroxy group, or a nitro group.

3. The electrolyte as claimed in claim 1, wherein, in Formula 1, $R_1$ to $R_3$ are each independently an unsubstituted $C_1$-$C_{30}$ alkyl group.

4. The electrolyte as claimed in claim 1, wherein the lithium salt includes at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, in which $2 \leq x \leq 20$ and $2 \leq y \leq 20$, LiCl, LiI, lithium bis(oxalato) borate, or $LiPO_2F_2$.

5. The electrolyte as claimed in claim 1, wherein the non-aqueous organic solvent includes at least one of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, or tetrahydrofuran.

6. The electrolyte as claimed in claim 1, wherein the non-aqueous organic solvent includes a mixed solvent of about 50 vol % to about 95 vol % of a chain carbonate and about 5 vol % to about 50 vol % of a cyclic carbonate.

7. A lithium secondary battery, comprising:
a cathode;
an anode; and
the electrolyte as claimed in claim 6.

8. The lithium secondary battery as claimed in claim 7, wherein the cathode includes a cathode active material having a layered structure.

9. The lithium secondary battery as claimed in claim 8, wherein the cathode active material is represented by Formula 2:

$$Li_sNi_{1-t}M_tO_2 \qquad \text{<Formula 2>}$$

wherein, in Formula 2,
M is Co, Mn, Al, Cu, Fe, Mg, Cr, Zn, B, or Ga, and $0.9 \leq s \leq 1.2$ and $0 < t \leq 0.99$ are satisfied.

10. The lithium secondary battery as claimed in claim 8, wherein the cathode active material is represented by Formula 3 or Formula 4:

$$Li_sNi_{t'}Co_{1-t'-u'}Al_{u'}O_2 \qquad \text{<Formula 3>}$$

$$Li_sNi_{t'}Co_{1-t'-u'}Mn_{u'}O_2 \qquad \text{<Formula 4>}$$

wherein, in Formulae 3 and 4, $0.9 \leq s' \leq 1.2$, $0.1 < t' \leq 0.98$, $0 < u' \leq 0.5$, and $0 < 1-t'-u' \leq 0.5$ are satisfied.

11. The lithium secondary battery as claimed in claim 7, wherein the anode includes at least one of an anode active material, the anode active material including a lithium metal, a metal alloyable with lithium, a transition metal oxide, a non-transition metal oxide, or a carbon material.

12. The lithium secondary battery as claimed in claim 11, wherein the anode active material includes at least one of a silicon compound, a carbon compound, a composite of the silicon compound and the carbon compound, or a silicon oxide ($SiO_a$, $0 < a < 2$).

* * * * *